Patented Aug. 22, 1933

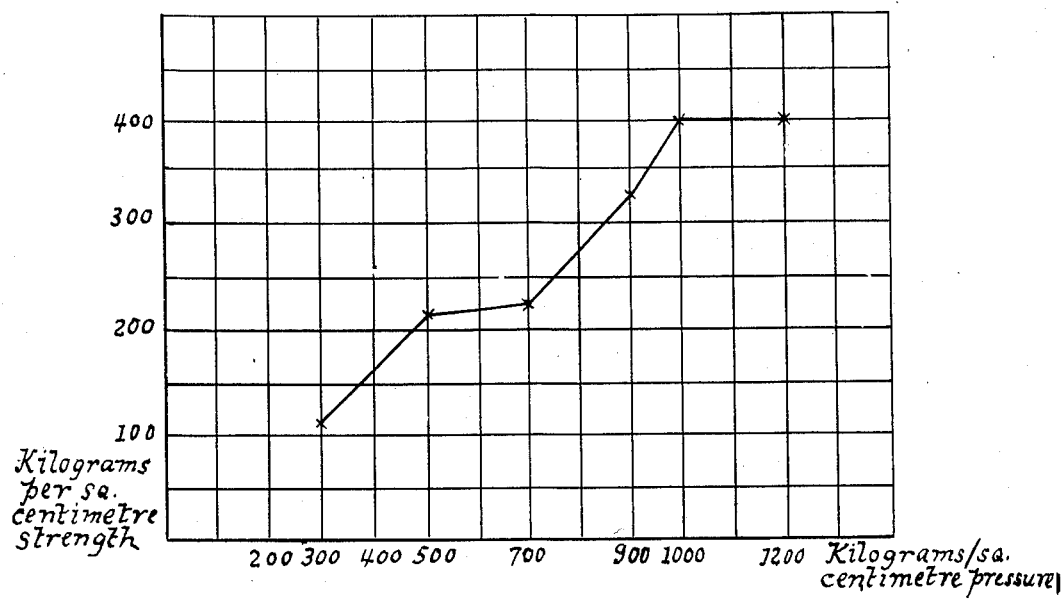

1,923,570

UNITED STATES PATENT OFFICE 1,923,570

PRODUCTION OF SODIUM CYANIDE

Konrad Gabel, Ludwigshafen - on - the - Rhine, Germany, assignor to I. G. Farbenindustrie Aktiengesellschaft, Frankfort - on - the - Main, Germany Application August 19, 1930, Serial No. 476,389, and in Germany September 7, 1929

3 Claims. (Cl. 23—79)

The present invention relates to improvements in the production of sodium cyanide.

As is well known, pulverulent sodium cyanide, such as is obtained for example by evaporating solutions of sodium cyanide, has a marked tendency to form dust and is inconvenient and very dangerous to handle; in commerce it is therefore advantageously pressed into briquettes. Hitherto, however, the avoidance of the said drawback by this treatment has not been successful since the briquettes readily break in transport and are partially reduced again to dust by reason of the fact that the conglomeration of the single particles effected by the pressing processes hitherto in use does not lead to sufficiently compact and firm products.

I have now found that briquettes of sodium cyanide which do not show the aforesaid drawbacks can be obtained from dry powders of the said cyanide which may contain some potassium cyanide, by subjecting them to a mechanical pressure exceeding 700 kilograms per square centimetre at which pressure a conversion of the mass into a transparent vitreous state occurs, which becomes still more apparent when a pressure of about 1000 kilograms or still higher pressures are applied. In order to keep the salt, or salts, dry during pressing they are preferably warmed to, say, 50° C. before, and/or during, pressing. By this treatment the particles of powder are welded together into a uniform mass in which the original structure can no longer be detected and which is even different in its physical properties from the product obtainable by pressing in the presence of water or by cooling the fused salt which latter has a very compact coherent form but still crystalline appearance, so that lumps of the fused salt have a tendency to breakage along the crystal surfaces. The masses pressed in the aforesaid manner have an extraordinary strength and produce no dust when violently shattered but only produce large fragments which cause no trouble in handling. Thus by the process according to the present invention products at least equal in value to the cooled melts are obtained simply by pressing, and there is the advantage that the inconveniences and losses of material arising in the fusion by decomposition by heat or air do not occur.

The drawing shows a graph of the strength of the cyanide product for various pressures to which the product has been subjected.

In the diagram the strength values obtainable by pressing sodium cyanide at different pressures are shown, the strength curve having a precise and surprising bend at the point of pressing at 700 atmospheres. The strength values are as follows:

| Kilograms per square centimetre | At a pressure of |
|---|---|
| | Kilograms per square centimetre |
| 114 | 300 |
| 217 | 500 |
| 230 | 700 |
| 321 | 900 |
| 398 | 1000 |
| 402 | 1200 |

What I claim is:—

1. Sodium cyanide briquettes which are transparent and have a mechanical strength of at least 230 kilograms per square centimetre.

2. In the production of sodium cyanide briquettes by pressure, the step which consists in pressing pulverulent dry sodium cyanide at a pressure of at least 700 kilograms per square centimetre.

3. In the production of sodium cyanide briquettes by pressure, the step which consists in pressing pulverulent dry sodium cyanide at a pressure of at least 700 kilograms per square centimetre while warming.

KONRAD GABEL.